(12) United States Patent
Tan

(10) Patent No.: US 12,493,311 B2
(45) Date of Patent: Dec. 9, 2025

(54) MULTI-OUTPUT LINEAR REGULATOR

(71) Applicant: PixArt Imaging Incorporation, Hsinchu (TW)

(72) Inventor: Kok-Siang Tan, Penang (MY)

(73) Assignee: PIXART IMAGING INCORPORATION, Hsinchu (TW)

( * ) Notice: Subject to any disclaimer, the term of this patent is extended or adjusted under 35 U.S.C. 154(b) by 478 days.

(21) Appl. No.: 18/059,396

(22) Filed: Nov. 28, 2022

(65) Prior Publication Data

US 2024/0176375 A1    May 30, 2024

(51) Int. Cl.
| | | |
|---|---|---|
| G05F 1/577 | (2006.01) | |
| G05F 1/56 | (2006.01) | |
| G05F 1/563 | (2006.01) | |
| G05F 1/575 | (2006.01) | |
| G05F 1/59 | (2006.01) | |

(52) U.S. Cl.
CPC ............... G05F 1/577 (2013.01); G05F 1/56 (2013.01); G05F 1/561 (2013.01); G05F 1/563 (2013.01); G05F 1/575 (2013.01); G05F 1/59 (2013.01)

(58) Field of Classification Search
CPC ......... H02M 3/156; G05F 1/565; G05F 1/577
See application file for complete search history.

(56) References Cited

U.S. PATENT DOCUMENTS

| | | | | |
|---|---|---|---|---|
| 5,491,401 | A * | 2/1996 | Inoue | H03K 17/0826 |
| | | | | 323/273 |
| 7,064,529 | B2 * | 6/2006 | Telecco | G05F 1/465 |
| | | | | 323/267 |
| 7,319,314 | B1 * | 1/2008 | Maheshwari | G05F 1/46 |
| | | | | 327/543 |
| 8,987,949 | B1 * | 3/2015 | Chui | G05F 1/56 |
| | | | | 307/155 |
| 2010/0109435 | A1 * | 5/2010 | Ahmadi | G06F 1/26 |
| | | | | 307/31 |

* cited by examiner

*Primary Examiner* — Gary L Laxton
(74) *Attorney, Agent, or Firm* — Tung & Associates

(57) ABSTRACT

A multi-output linear regulator includes: a main output stage circuit, configured to operably generate a reference output voltage according to a main control voltage; an error amplifier, configured to operably amplify a difference between a reference voltage and a feedback signal to generate the main control voltage, wherein the feedback signal is related to the reference output voltage; a first voltage converter, configured to operably level-shift the main control voltage with a first voltage shifting level to generate a first control voltage; a first output stage circuit, configured to operably generate a first output voltage according to the first control voltage; and a second output stage circuit, configured to operably generate a second output voltage according to the main control voltage.

10 Claims, 10 Drawing Sheets

MULTI-OUTPUT LINEAR REGULATOR

BACKGROUND OF THE INVENTION

Field of Invention

The present invention relates to a linear regulator. Particularly it relates to a multi-output linear regulator.

Description of Related Art

FIG. 1 shows a prior art linear regulator 1001 which includes an error amplifier 100, a first output stage circuit 200 and a second output stage circuit 300. This prior art includes a reference tracking loop that sets the output voltage level of the regulated output voltage Vregout, and a fast tracking loop that responds to fast load transient at the regulated output voltage Vregout.

As shown in FIG. 1, a power transistor Mpp of the first output stage circuit 200 generates the reference regulation signal Vregout_ref according to a driving voltage Vpg. A current steering transistor Mset is controlled by a main control voltage Vset generated by the error amplifier 100 to steer a first bias current Ibb1 and a second bias current Ibb2 of a primary bias current Ibb.

The prior art in FIG. 1 has only one regulated output voltage Vregout. In applications requiring multi-output regulated output voltages, such as in powering different IP (intellectual property) circuits of navigation systems, plural linear regulators as in FIG. 1 will be needed, which causes higher cost and power consumption.

For providing multiple regulated outputs with different levels while maintaining low power consumption and low cost, the present invention proposes a novel multi-output linear regulator.

SUMMARY OF THE INVENTION

From one perspective, the present invention provides a multi-output linear regulator, comprising: a main output stage circuit, configured to operably generate a reference output voltage according to a main control voltage; an error amplifier, configured to operably amplify a difference between a reference voltage and a feedback signal to generate the main control voltage, wherein the feedback signal is related to the reference output voltage; a first voltage converter, configured to operably level-shift the main control voltage with a first voltage shifting level to generate a first control voltage; a first output stage circuit, configured to operably generate a first output voltage according to the first control voltage; and a second output stage circuit, configured to operably generate a second output voltage according to the main control voltage.

The multi-output linear regulator of claim 1, further comprising: a second voltage converter, configured to operably level-shift the main control voltage with a second voltage shifting level to generate a second control voltage; wherein the second output stage circuit is configured to operably generate a second output voltage according to the second control voltage.

In one embodiment, a voltage difference between the first output voltage and the reference output voltage is related to, or equal to the first voltage shifting level.

In one embodiment, each of the main output stage circuit, the first and the second output stage circuits includes: a control terminal, a regulated output terminal; a bias current source, configured to operably generate a primary bias current at a bias node, wherein the primary bias current includes a first bias current and a second bias current; and a first current branch and a second current branch, coupled to the bias node, wherein the first bias current and the second bias current flow through the first current branch and the second current branch respectively; wherein the first current branch is configured to operably generate a driving voltage according to the first bias current; wherein the second current branch is configured to operably steer the second bias current, so as to steer the first bias current, according to a voltage difference between the regulated output voltage at the regulated output terminal and a control voltage received through the control terminal, and is configured to regulate the regulated output voltage according to the driving voltage and the second bias current; wherein the control voltage of the main output stage circuit, the first and the second output stage circuits correspond to the main control voltage, the first and the second control voltages respectively, and the regulated output voltage of the main output stage circuit, the first and the second output stage circuits correspond to the reference output voltage, the first and the second output voltages respectively.

In one embodiment, the first current branch includes: a bias load transistor and a common gate transistor, which are coupled in series between an input power and the bias node, and are configured to operably generate the driving voltage at a driving node according to the first bias current, wherein gates of the bias load bias load transistor and the common gate transistor are biased by a first bias voltage and a second bias voltage; wherein the second current branch includes: a power transistor and a current steering transistor, which are coupled in series between the input power and the bias node, and are coupled at the regulated output terminal, wherein the driving voltage and the control voltage are configured to control gates of the power transistor and a current steering transistor to generate the regulated output voltage.

In one embodiment, at least one of the first output stage circuit or the second output stage circuit includes an overshoot suppressor circuit, wherein the overshoot suppressor circuit includes: a first overshoot suppressing transistor and a suppressing resistor coupled in series to the regulated output terminal and configured as a source follower, wherein a gate and a drain of the first overshoot suppressing transistor are coupled to the bias node and the regulated output terminal; and a second overshoot suppressing transistor, coupled between the regulated output terminal and a ground, wherein a gate of the second overshoot suppressing transistor is coupled to an output of the source follower; wherein the first overshoot suppressing transistor and the second overshoot suppressing transistor are configured to turn on when an overshoot of the regulated output voltage occurs, so as to suppress the overshoot.

In one embodiment, each voltage converter of the first and the second voltage converter includes: an adjusting resistor, coupled between a shift input terminal and a shift output terminal of the voltage converter; and at least a current source and at least a current sink which are configured in pair and have identical current levels, wherein the current source supplies a first adjusting current to a first end of the adjusting resistor and the current sink drains a second adjusting current from a second end of the adjusting resistor, whereby a voltage shifting level is generated across the adjusting resistor and is determined by a resistance of the adjusting resistor and the current levels of the current source and the current sink; wherein the voltage shifting level of the first voltage converter corresponds to the first voltage shifting level, and the voltage shifting level of the second voltage converter corresponds to the second voltage shifting level.

In one embodiment, the multi-output linear regulator further comprises a main compensation capacitor which is coupled to the main control voltage for stabilizing a main regulation loop formed by the error amplifier and the main output stage circuit.

In one embodiment, a drain of the power transistor are coupled to the regulated output terminal such that the power transistor is configured as an inverting amplifier stage, wherein the output stage circuit further includes an output compensation capacitor which is coupled between the control terminal and the regulated output terminal for stabilizing a fast regulation loop formed by the first current branch and the second current branch.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
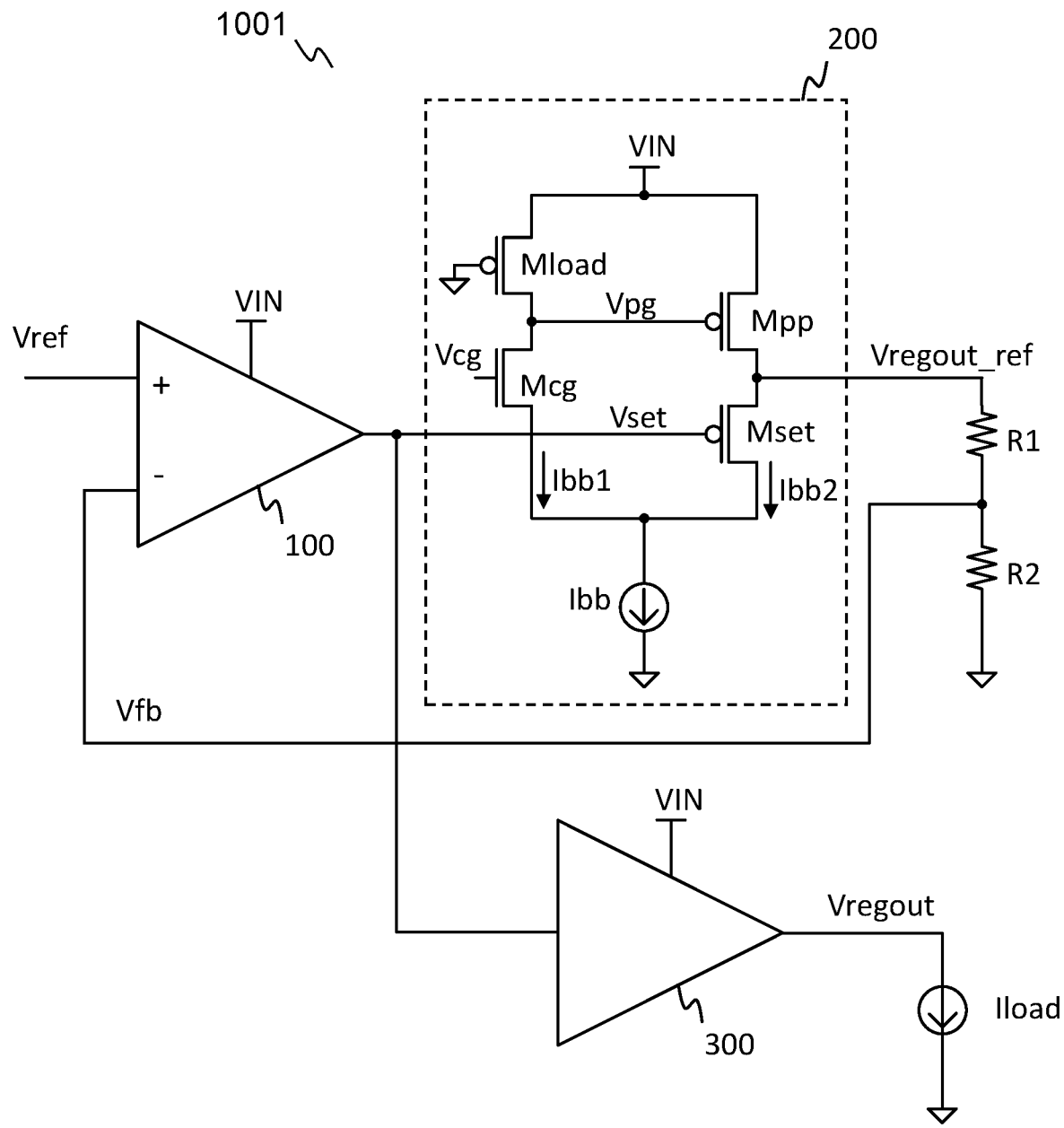
FIG. 1 shows a schematic diagram of a prior art linear regulator.
Figure 2:
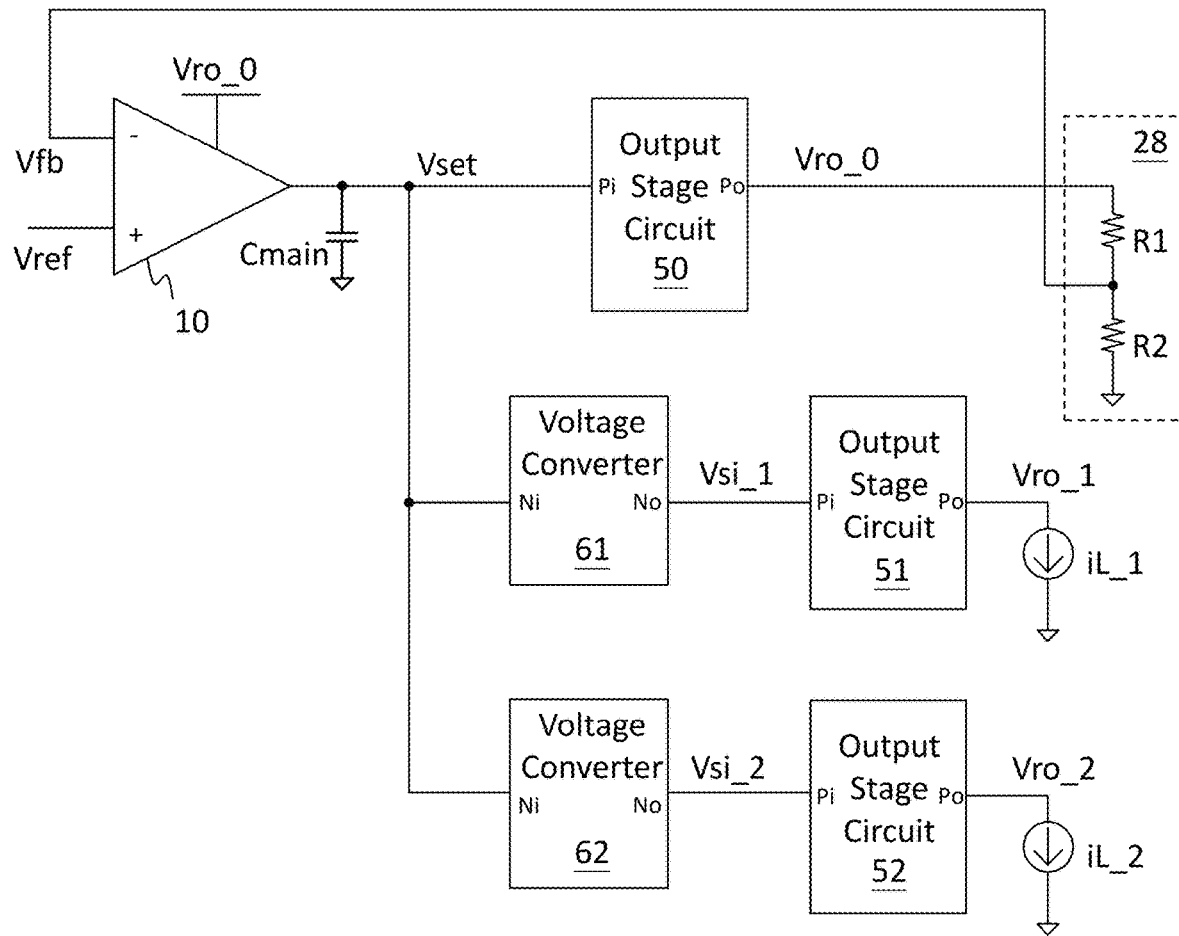
FIG. 2 shows a block diagram of an embodiment of the multi-output linear regulator according to the present invention.

FIG. 2 shows a schematic diagram of an embodiment of the multi-output linear regulator according to the present invention (multi-output linear regulator 1002). In one embodiment, as shown in FIG. 2, the multi-output linear regulator 1002 comprises a error amplifier 10, output stage circuits 50, 51 and 52, and voltage converters 61 and 62. The output stage circuit 50 is configured to operably generate a reference output voltage Vro_0 according to a main control voltage Vset generated by the error amplifier 10. The error amplifier 10 is configured to operably amplify a difference between a reference voltage Vref and a feedback signal Vfb to generate the main control voltage Vset. The feedback signal Vfb is related to the reference output voltage Vro_0. In on embodiment, the feedback signal Vfb is a voltage division of the reference output voltage Vro_0 and is generated by feedback network 28 which includes resistors R1 and R2. In one embodiment, the power of error amplifier 10 is supplied by the reference output voltage Vro_0 for higher accuracy and lower noise.

In one embodiment, the multi-output linear regulator 1002 further comprises a main compensation capacitor Cmain which is coupled to the main control voltage Vset for stabilizing the main regulation loop formed by the error amplifier 10 and the main output stage circuit 50.

The output stage circuits 51 and 52 are configured to operably generate a first output voltage Vro_1 and a second output voltage Vro_2 respectively according to the main control voltage Vset. In this embodiment, the output voltages Vro_1 and Vro_2 are configured to drive loads iL_1 and iL_2 respectively.

Figure 3A:
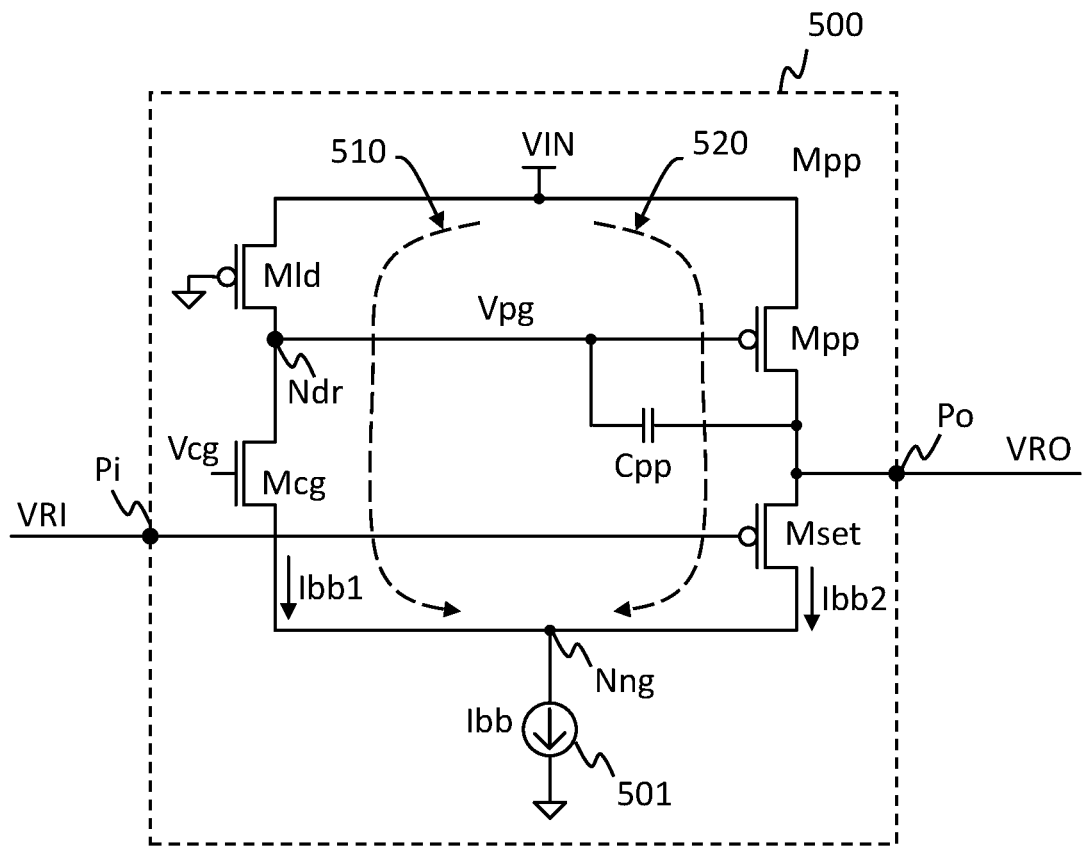
FIG. 3A shows a schematic diagram of a specific embodiment of the output stage circuit of the multi-output linear regulator according to the present invention.

Also referring to FIG. 3A which shows a schematic diagram of a specific embodiment of the output stage circuit 500 of the multi-output linear regulator according to the present invention. In one embodiment, topologies of the output stage circuits 50, 51 and 52 are identical and correspond to the output stage circuit 500 shown in FIG. 3A.

Still referring to FIG. 3A, in one embodiment, the output stage circuit 500 includes a power transistor Mpp, a current steering transistor Mset, a common gate transistor Mcg, a bias load transistor Mld and a bias current source 501.

The bias current source 501 is configured to operably generate a primary bias current Ibb at a bias node Nng. The bias load transistor Mld and the common gate transistor Mcg are coupled in series between an input power Vin and the bias node Nng to form a first current branch 510. The power transistor Mpp and the current steering transistor Mset are coupled in series between an input power Vin and the bias node Nng to form a second current branch 520, wherein the power transistor Mpp and the current steering transistor Mset are coupled at a regulated output terminal Po.

In one embodiment, the gate of the bias load transistor Mld is coupled to a fixed voltage, for example a ground level as shown in FIG. 3A. The gate of the common gate transistor Mcg is biased by a bias voltage Vcg. In one embodiment, the bias load transistor Mld and the common gate transistor Mcg are configured to operably generate a driving voltage Vpg, at the driving node Ndr where the bias load transistor Mld and the common gate transistor Mcg are coupled, according to a first bias current Ibb1 of the primary bias current Ibb. Note that the first bias current Ibb1 of the primary bias current Ibb flows through the first current branch 510.

In this embodiment, the power transistor Mpp is configured as an inverting amplifier stage (i.e. drain coupled to the regulated output terminal Po) and is controlled by the driving voltage Vpg, and the current steering transistor Mset is configured as a source follower stage (i.e. source coupled to the regulated output terminal Po) and is controlled by a control voltage VRI through a control terminal Pi of the output stage circuit 500. The power transistor Mpp and the current steering transistor Mset are configured to generate an output voltage VRO at the regulated output terminal Po of the output stage circuit 500. A second bias current Ibb2 of the primary bias current Ibb flows through the aforementioned second current branch 520.

The gate-source voltage of current steering transistor Mset (i.e. the voltage difference between the input voltage VRI and the output voltage VRO) controls the level of the second bias current Ibb2. The first bias current Ibb1 also changes in response to the change of the second bias current Ibb2. For example, when the voltage difference between the input voltage VRI and the output voltage VRO is reduced (e.g. due to the output voltage VRO drops), the second bias current Ibb2 decreases accordingly, and the first bias current Ibb1 increases in response to the decreasing of the second bias current Ibb2. In this case, the driving voltage Vpg decreases in response to the increasing of the first bias current Ibb1, which turns on the power transistor Mpp more and pulls the output voltage VRO up. In other words, the output stage circuit 500 is apt to regulate the output voltage VRO at a level which is the input voltage VRI level-shifted by the source-gate voltage of current steering transistor Mset. From one perspective, the output stage circuit can be considered as a fast regulation loop.

Figure 3B:
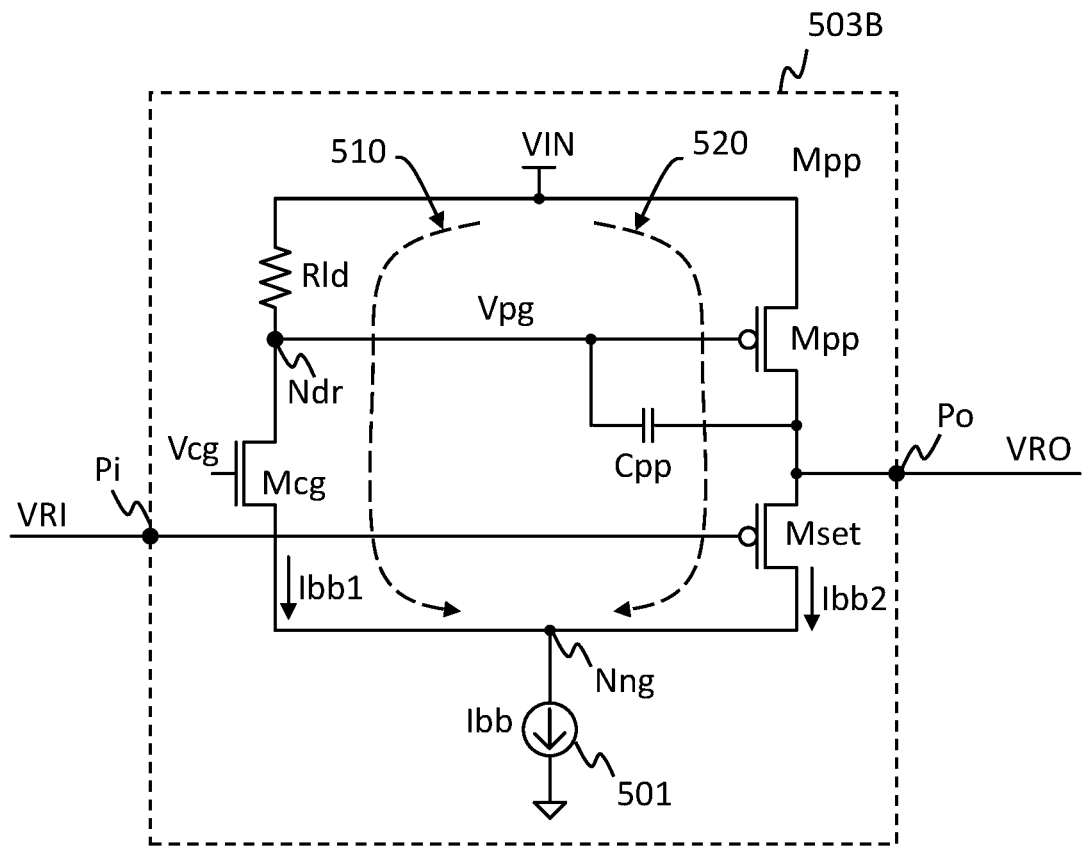
FIG. 3B shows a schematic diagram of a specific embodiment of the output stage circuit of the multi-output linear regulator according to the present invention.

FIG. 3B shows a schematic diagram of a specific embodiment of the output stage circuit 503B of the multi-output linear regulator according to the present invention. The output stage circuit 503B is similar to the output stage circuit in FIG. 3A. In this embodiment, the bias load device of the output stage circuit 503B is a bias load resistor Rld, and all the aforementioned functions keep the same in this embodiment.

Still referring to FIG. 3A, in one embodiment, the output stage circuit 500 further includes an output compensation capacitor Cpp which is coupled between the driving node Ndr and the regulated output terminal Po for stabilizing a fast regulation loop formed by the first current branch 510 and the second current branch 520.

It is noteworthy that the sizing of the components (e.g. transistors, capacitors, bias current, etc) of different output stage circuits can be independently determined by the current requirements of the corresponding loads (e.g. R1 and R2, load iL_1 or iL_2). In one preferred embodiment, the ratio of sizing between corresponding components of different output stage circuits is correlated. For example, in one embodiment, the main bias currents (Ibb) of different output stage circuits can be set to the same or different values. In one embodiment, the relationship between the primary bias current Ibb of the main output stage circuit 50 and the sizing of the current steering transistor Mset of the main output stage circuit 50 is correlated to the relationship between the primary bias current Ibb of the first output stage circuit 51 and the sizing of the current steering transistor Mset of the first output stage circuit 51, such that the first output voltage Vro_1 tracks the reference output voltage Vro_0.

On the other hand, the sizing of the power transistor Mpp of the first output stage circuit 51 or the second output stage circuit 52 can be determined according to the corresponding load and is not necessarily the same as the sizing of the power transistor Mpp of the main output stage circuit 50.

Referring back to FIG. 2, the main control voltage Vset and the reference output voltage Vro_0 are corresponded respectively to the input voltage VRI and the output voltage VRO of the output stage circuit 50. A main loop formed by the error amplifier 10, the feedback network 28, and the output stage circuits 50 regulates the reference output voltage Vro_0 according to the reference voltage Vref based on the operation principle of the output stage circuit described hereinbefore.

Still referring to FIG. 2, in this embodiment, the voltage converters 61 and 62 are configured to operably level-shift the main control voltage Vset to a first control voltage Vsi_1 and a second control voltage Vsi_2 respectively.

The first control voltage Vsi_1 and the first output voltage Vro_1 are corresponded respectively to the input voltage VRI and the output voltage VRO of the output stage circuit 51. The second control voltage Vsi_2 and the second output voltage Vro_2 are corresponded respectively to the input voltage VRI and the output voltage VRO of the output stage circuit 52.

Based on the aforementioned operation principles of the output stage circuit 500, the first output voltage Vro_1 is regulated by the output stage circuit 51 according to the first control voltage Vsi_1. Since the first control voltage Vsi_1 is a level-shifted version of the main control voltage Vset, the first output voltage Vro_1 is regulated to a level which is the reference output voltage Vro_0 plus a difference (i.e. voltage shifting level) between the first control voltage Vsi_1 and the main control voltage Vset. Similarly, the second output voltage Vro_2 is regulated to a level which is the reference output voltage Vro_0 plus a difference (i.e. voltage shifting level) between the second control voltage Vsi_2 and the main control voltage Vset. In other words, the multi-output linear regulator 1002 is configured to operably provide multiple output voltages for multiple loads with only one error amplifier 10. From one perspective, the error amplifier 10 (for providing the main control voltage Vset), the voltage converter 61 and the output stage circuit 51 form a fast response loop. The error amplifier 10, the voltage converter 62 and the output stage circuit 52 form another fast response loop.

Based on a predetermined reference voltage Vref, the levels of the first output voltage Vro_1 and the second output voltage Vro_2 can be set by voltage shifting levels of the voltage converters 61 and 62 respectively. For example, assuming the level of the reference voltage Vref is Vrf0, when the voltage shifting levels of the voltage converters 61 and 62 are set to dV1 and dV2 respectively, the levels of the first output voltage Vro_1 and the second output voltage Vro_2 are regulated to Vrf0+dV1 and Vrf0+dV2 respectively. Note that each of the voltage shifting levels dV1 and dV2 is a real number. The first output voltage Vro_1 and the second output voltage Vro_2 are selectable to be the same or different. Each of the first output voltage Vro_1 and the second output voltage Vro_2 is selectable to be higher than, lower than or equal to the reference voltage Vref.

Figure 4A:
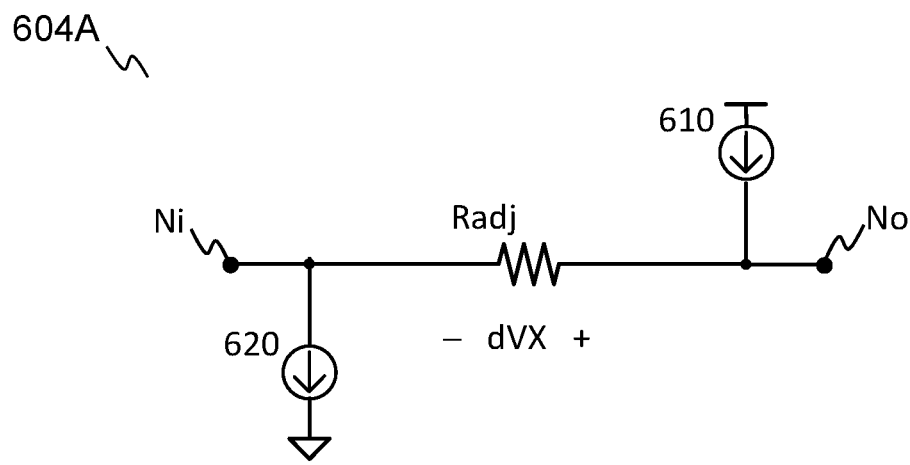
FIG. 4A~FIG. 4C show schematic diagrams of embodiments of the voltage converter of the multi-output linear regulator according to the present invention.

FIG. 4A shows a schematic diagram of an embodiment of the voltage converter 604A of the multi-output linear regulator according to the present invention. In one embodiment, the voltage converter 600 includes an adjusting resistor Radj, a level-up current source 610 and a level-up current sink 620. In this embodiment, the voltage shifting level dVX between a shift output terminal No and a shift input terminal Ni of the voltage converter 604A is positive when the level-up current source 610 and a level-up current sink 620 provide non-zero currents having the same level flowing through the adjusting resistor Radj, and is determined by the product of the resistance of the adjusting resistor Radj and the current level of the level-up current source 610 and a level-up current sink 620. In one embodiment, the resistance of the adjusting resistor Radj is predetermined or adjustable. In one embodiment, the current level of the current source and the current sink is predetermined or adjustable.

Figure 4B:
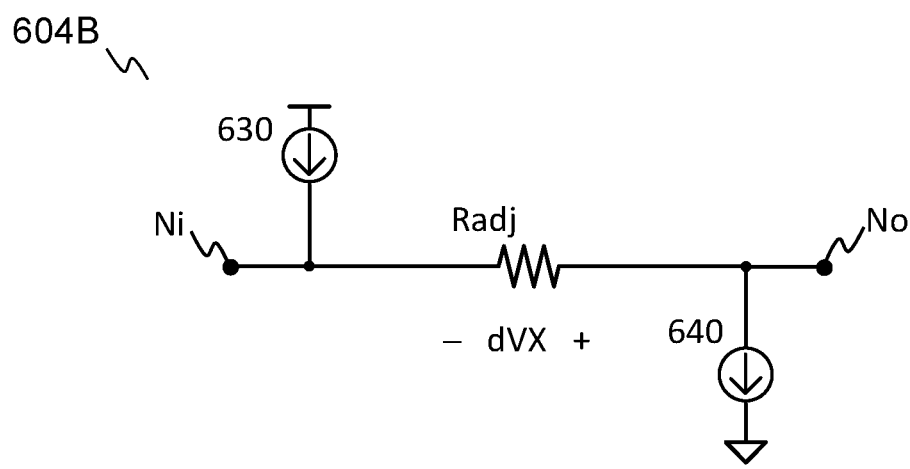

FIG. 4B shows a schematic diagram of an embodiment of the voltage converter 604B of the multi-output linear regulator according to the present invention. In one embodiment, the voltage converter 604B includes an adjusting resistor Radj, a level-down current source 630 and a level-down current sink 640. The voltage converter 604B is similar to the voltage converter 604A. In the voltage converter 604B, the voltage shifting level dVX is negative when the level-down current source 630 and the level-down current sink 640 provide non-zero currents having the same level flowing through the adjusting resistor Radj, and is determined by the product of the resistance of the adjusting resistor Radj and the current level of the level-down current source 630 and the level-down current sink 640.

Figure 4C:
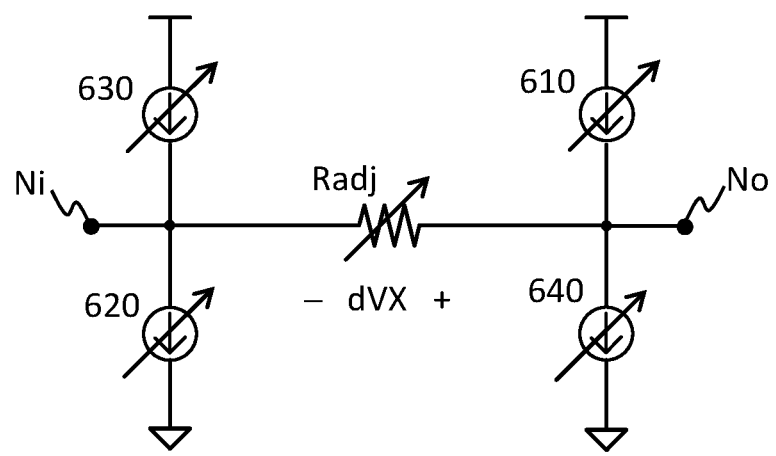

FIG. 4C shows a schematic diagram of an embodiment of the voltage converter 604C of the multi-output linear regulator according to the present invention. In one embodiment, the voltage converter 604C includes an adjusting resistor Radj, a level-up current source 610, a level-up current sink 620, a level-down current source 630 and a level-down current sink 640. The voltage converter 604C is a combination of the voltage converters 604A and 604B. In the voltage converter 604C, the voltage shifting level dVX is determined by the net current flowing through the adjusting resistor Radj and the resistance of the adjusting resistor Radj. In a preferred embodiment, at least one of the resistance of the adjusting resistor Radj or the current levels of the current sources and current sinks is programmable external to the voltage converter for setting the voltage shifting level dVX.

Figure 5:
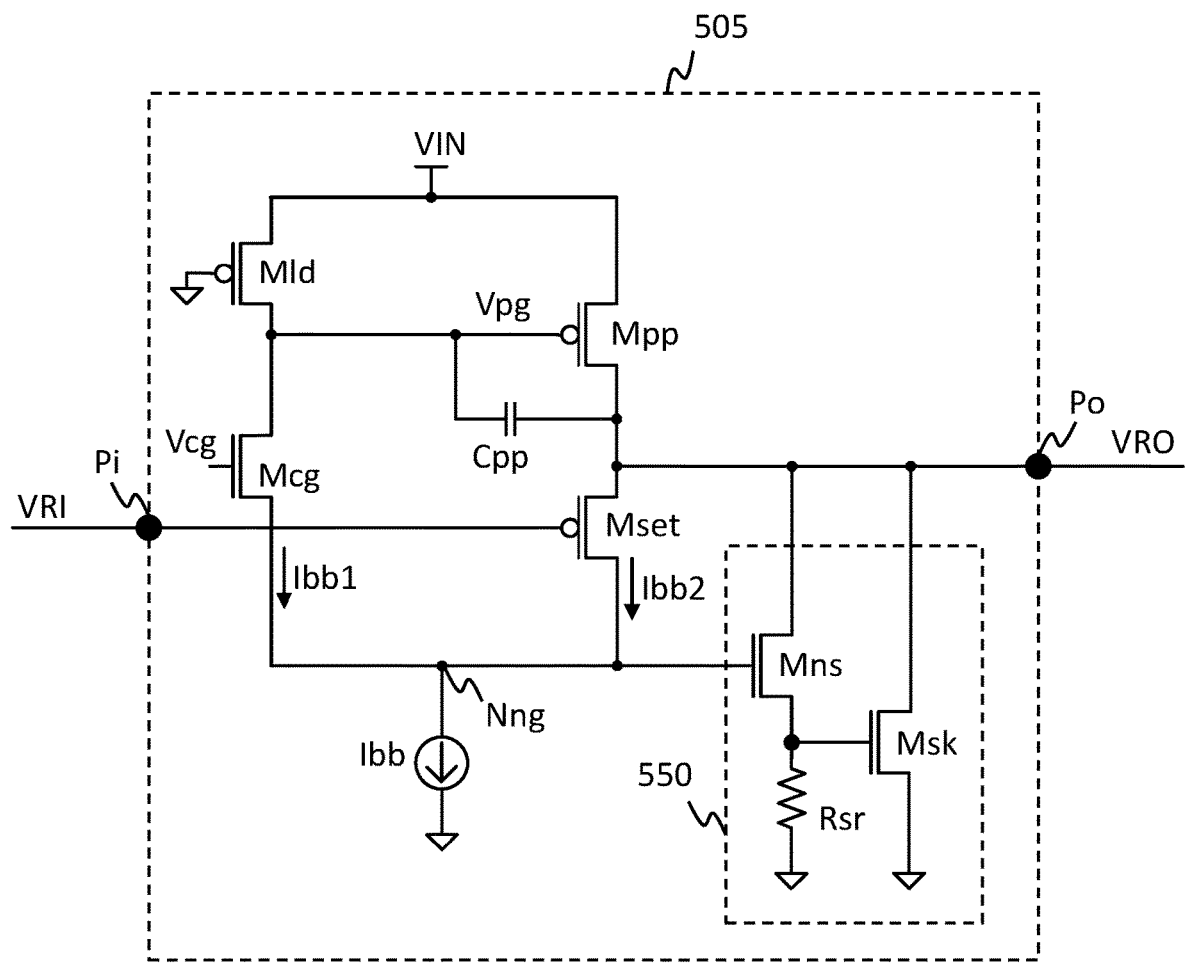
FIG. 5 shows a schematic diagram of a specific embodiment of the output stage circuit having an overshoot suppressor circuit of the multi-output linear regulator according to the present invention.

FIG. 5 shows a schematic diagram of a specific embodiment of the output stage circuit 505 having an overshoot suppressor circuit 550 of the multi-output linear regulator according to the present invention. The output stage circuit (e.g. 51 or 52 in FIG. 2) of the fast response loop further includes an overshoot suppressor circuit 550. In this embodiment, the overshoot suppressor circuit 550 includes a first overshoot suppressing transistor Mns, an overshoot suppressing resistor Rsr and a second overshoot suppressing transistor Msk. The first overshoot suppressing transistor Mns an overshoot suppressing resistor Rsr are coupled in series between the regulated output terminal Po and ground and is configured as a source follower. More specifically, a gate and a drain of the first overshoot suppressing transistor Mns are coupled to the bias node Nng and the regulated output terminal Po. The second overshoot suppressing transistor Msk is coupled between the regulated output terminal Po and ground. More specifically, a gate of the second overshoot suppressing transistor Msk is coupled to an output of the source follower. When an overshoot occurs at the output voltage VRO, the current steering transistor Mset steers the second bias current Ibb2 larger, and the voltage on the bias node Nng increases accordingly. Consequently, the first overshoot suppressing transistor Mns and the second overshoot suppressor transistor Msk are turned on, which pulls the output voltage VRO down and suppresses the overshoot of the output voltage VRO.

Figure 6:
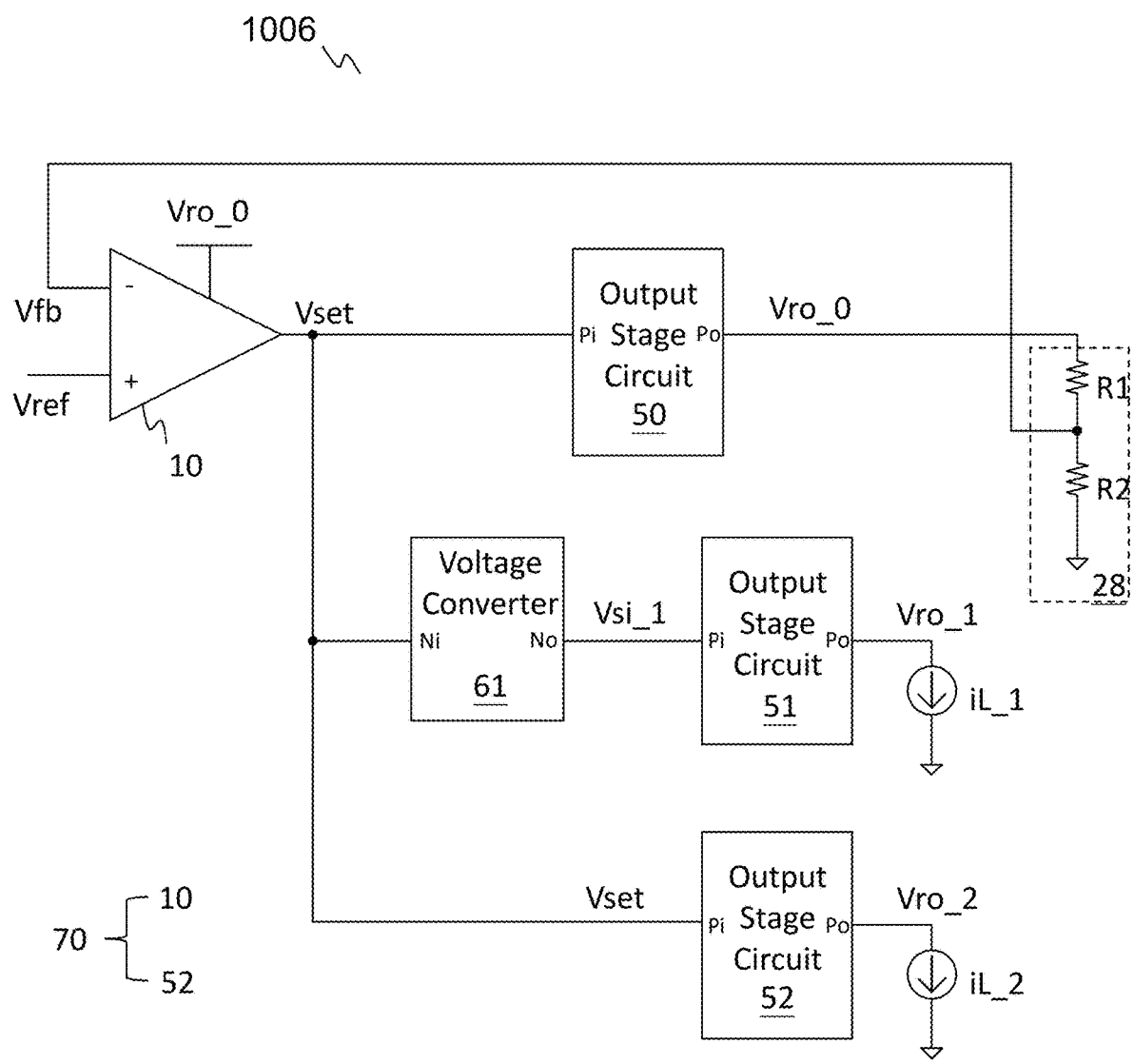
FIG. 6 shows a block diagram of another embodiment of the multi-output linear regulator according to the present invention.

FIG. 6 shows a block diagram of another embodiment of the multi-output linear regulator 1006 according to the present invention. The multi-output linear regulator 1006 is similar to the multi-output linear regulator 1002 and differs in that the output stage circuit 52 of the multi-output linear regulator 1006 is controlled by the main control voltage Vset directly. In other words, the fast response loop 70 includes the error amplifier 10 and the output stage circuit 52, without a voltage converter. In this embodiment, the second output voltage Vro_2 is determined by the reference voltage Vref, while the first output voltage Vro_1 is determined by the reference voltage Vref and the voltage shifting level dVX of the voltage converter 61.

Figure 7:
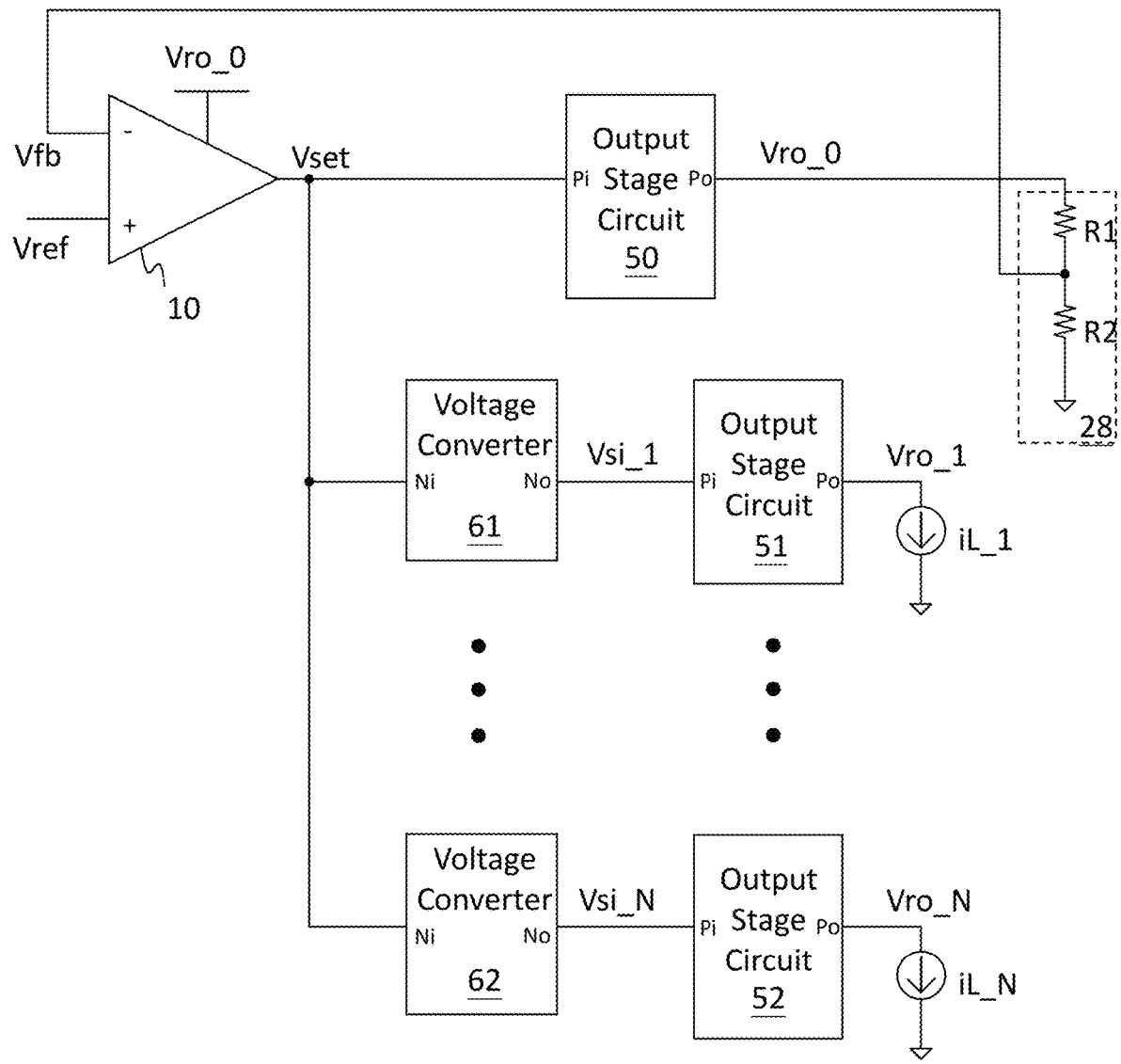
FIG. 7 shows a block diagram of an embodiment of the multi-output linear regulator according to the present invention.

FIG. 7 shows a block diagram of an embodiment of the multi-output linear regulator 1007 according to the present invention. In one embodiment, the embodiment in FIG. 2 can be extended to an N-output linear regulator configured to generate N output voltages to N loads, wherein N is a positive integer larger than 1.

Figure 8:
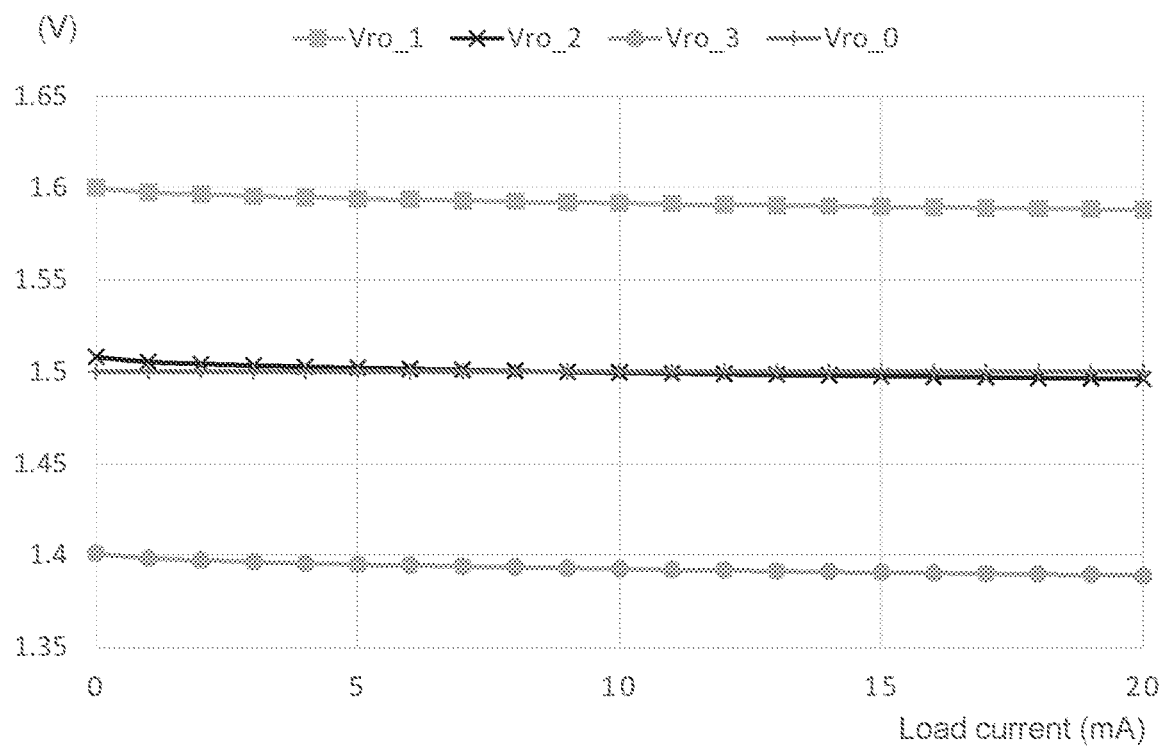
FIG. 8 shows load regulation curves of an embodiment of the multi-output linear regulator according to the present invention.

FIG. 8 shows load regulation curves of an embodiment of a 3-output linear regulator according to the present invention. In this embodiment, the reference output voltage Vro_0 is set to 1.5V, the output voltages Vro_1, Vro_2, Vro_3 are set and regulated to 1.6V, 1.5V and 1.4V respectively. Simulation shows high accuracy of regulation across load current from OA to 20 mA.

Figure 9:
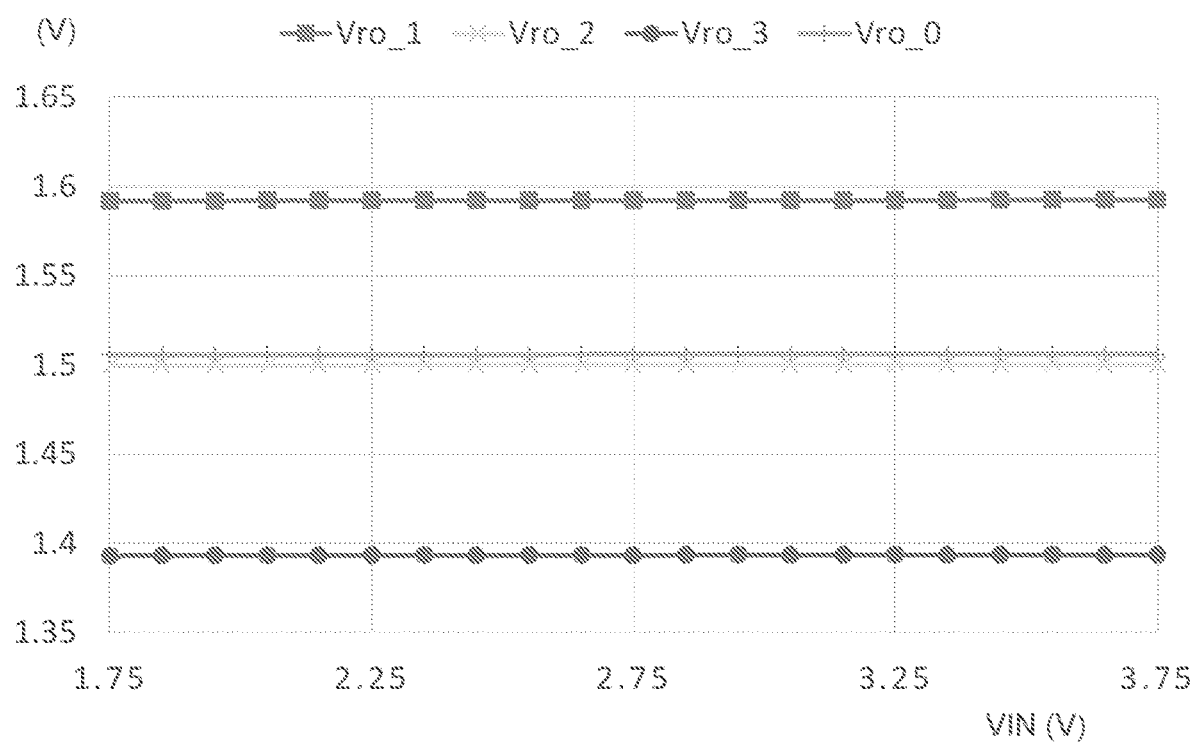
FIG. 9 shows line regulation curves of an embodiment of the multi-output linear regulator according to the present invention.

FIG. 9 shows line regulation curves of an embodiment of the multi-output linear regulator according to the present invention. In this embodiment, simulation shows high accuracy of regulation across input voltage VIN from 1.75V to 3.75V.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:
1. A multi-output linear regulator, comprising:
a main output stage circuit, configured to operably generate and regulate a reference output voltage according to a main control voltage;
an error amplifier, configured to operably amplify a difference between a reference voltage and a feedback signal to generate the main control voltage, wherein the feedback signal is related to the reference output voltage, wherein the error amplifier and the main output stage circuit jointly form a main regulation loop configured to regulate the reference output voltage according to the reference voltage;
a first voltage converter, configured to operably level-shift the main control voltage with a first voltage shifting level to generate a first control voltage;
a first output stage circuit, configured to operably generate a first output voltage according to the first control voltage; and
a second output stage circuit, configured to operably generate a second output voltage according to the main control voltage;
wherein each of the main output stage circuit, the first output stage circuit and the second output stage circuit is configured to form a fast regulation loop that regu- lates a corresponding regulated output voltage to track a corresponding stage control voltage;

wherein the corresponding stage control voltage of the main output stage circuit corresponds to the main control voltage;

wherein the corresponding stage control voltage of the first output stage circuit corresponds to the first control voltage;

wherein the corresponding stage control voltage of the second output stage circuit is related to the main control voltage;

wherein the corresponding regulated output voltage of the main output stage circuit corresponds to the reference output voltage;

wherein the corresponding regulated output voltage of the first output stage circuit corresponds to the first output voltage;

wherein the corresponding regulated output voltage of the second output stage circuit corresponds to the second output voltage.

2. The multi-output linear regulator of claim 1, further comprising:

a second voltage converter, configured to operably level-shift the main control voltage with a second voltage shifting level to generate a second control voltage;

wherein the corresponding stage control voltage of the second output stage circuit corresponds to the second control voltage.

3. The multi-output linear regulator of claim 1, wherein a voltage difference between the first output voltage and the reference output voltage is related to, or equal to the first voltage shifting level.

4. The multi-output linear regulator of claim 1, wherein each of the main output stage circuit, the first and the second output stage circuits includes:

a control terminal, a regulated output terminal;

a bias current source, configured to operably generate a primary bias current at a bias node, wherein the primary bias current includes a first bias current and a second bias current; and a first current branch and a second current branch, coupled to the bias node, wherein the first bias current and the second bias current flow through the first current branch and the second current branch respectively;

wherein the first current branch is configured to operably generate a driving voltage according to the first bias current;

wherein the second current branch is configured to operably steer the second bias current, so as to steer the first bias current, according to a voltage difference between the corresponding regulated output voltage at the regulated output terminal and the corresponding stage control voltage received through the control terminal, and is configured to regulate the corresponding regulated output voltage according to the driving voltage and the second bias current.

5. The multi-output linear regulator of claim 4, wherein the first current branch includes:

a bias load transistor and a common gate transistor, which are coupled in series between an input power and the bias node, and are configured to operably generate the driving voltage at a driving node according to the first bias current, wherein gates of the bias load transistor and the common gate transistor are biased by a first bias voltage and a second bias voltage;

wherein the second current branch includes:

a power transistor and a current steering transistor, which are coupled in series between the input power and the bias node, and are coupled at the regulated output terminal, wherein the driving voltage and the corresponding stage control voltage are configured to control gates of the power transistor and a current steering transistor to generate the corresponding regulated output voltage.

6. The multi-output linear regulator of claim 4, wherein at least one of the first output stage circuit or the second output stage circuit includes an overshoot suppressor circuit, wherein the overshoot suppressor circuit includes:

a first overshoot suppressing transistor and a suppressing resistor coupled in series to the regulated output terminal and configured as a source follower, wherein a gate and a drain of the first overshoot suppressing transistor are coupled to the bias node and the regulated output terminal; and a second overshoot suppressing transistor, coupled between the regulated output terminal and a ground, wherein a gate of the second overshoot suppressing transistor is coupled to an output of the source follower;

wherein the first overshoot suppressing transistor and the second overshoot suppressing transistor are configured to turn on when an overshoot of the corresponding regulated output voltage occurs, so as to suppress the overshoot.

7. The multi-output linear regulator of claim 2, wherein each voltage converter of the first and the second voltage converter includes:

an adjusting resistor, coupled between a shift input terminal and a shift output terminal of the voltage converter; and at least a current source and at least a current sink which are configured in pair and have identical current levels, wherein the current source supplies a first adjusting current to a first end of the adjusting resistor and the current sink drains a second adjusting current from a second end of the adjusting resistor, thereby a voltage shifting level is generated across the adjusting resistor and is determined by a resistance of the adjusting resistor and the current levels of the current source and the current sink;

wherein the voltage shifting level of the first voltage converter corresponds to the first voltage shifting level, and the voltage shifting level of the second voltage converter corresponds to the second voltage shifting level.

8. The multi-output linear regulator of claim 1, further comprising a main compensation capacitor which is coupled to the main control voltage for stabilizing the main regulation loop formed by the error amplifier and the main output stage circuit.

9. The multi-output linear regulator of claim 5, wherein a drain of the power transistor are coupled to the regulated output terminal such that the power transistor is configured as an inverting amplifier stage, wherein each of the main output stage circuit, the first and the second output stage circuits further includes an output compensation capacitor which is coupled between the control terminal and the regulated output terminal for stabilizing the fast regulation loop formed by the first current branch and the second current branch.

10. The multi-output linear regulator of claim 1, wherein the corresponding stage control voltage of the second output stage circuit corresponds to the main control voltage.

* * * * *